US007766366B2

(12) United States Patent
Li

(10) Patent No.: US 7,766,366 B2
(45) Date of Patent: Aug. 3, 2010

(54) FOLDABLE BABY STROLLER FRAME

(75) Inventor: Wei-Yeh Li, Tainan County (TW)

(73) Assignee: Link Treasure Limited, Road Town, Tortola (VG)

( * ) Notice: Subject to any disclaimer, the term of this patent is extended or adjusted under 35 U.S.C. 154(b) by 472 days.

(21) Appl. No.: 11/851,632

(22) Filed: Sep. 7, 2007

(65) Prior Publication Data

US 2008/0061533 A1    Mar. 13, 2008

(30) Foreign Application Priority Data

Sep. 8, 2006  (TW) .............................. 95216069 U

(51) Int. Cl.
*B62B 7/00* (2006.01)
(52) U.S. Cl. .................. 280/642; 280/647; 280/650
(58) Field of Classification Search ................. 280/642, 280/647, 650, 657, 658, 47.39, 641
See application file for complete search history.

(56) References Cited

U.S. PATENT DOCUMENTS

| 2,842,374 | A  |   | 7/1958  | Benson et al. |        |
|-----------|----|---|---------|---------------|--------|
| 6,357,784 | B1 | * | 3/2002  | Mitzman       | 280/642|
| 7,118,121 | B2 | * | 10/2006 | Cheng et al.  | 280/642|
| 7,267,359 | B1 | * | 9/2007  | Yang et al.   | 280/642|
| 7,367,581 | B2 | * | 5/2008  | Yang          | 280/642|
| 7,441,794 | B2 | * | 10/2008 | Lan           | 280/642|
| 7,527,283 | B2 | * | 5/2009  | Horacek       | 280/642|
| 2005/0098983 | A1 | * | 5/2005 | Cheng et al. | 280/642|

FOREIGN PATENT DOCUMENTS

| DE | 10132019 A1 | 1/2003 |
| EP | 0522783 A2  | 1/1993 |
| EP | 1764281 A2  | 3/2007 |

* cited by examiner

*Primary Examiner*—Glenn Dayoan
*Assistant Examiner*—Katy Meyer
(74) *Attorney, Agent, or Firm*—Morris, Manning & Martin LLP; Tim Tingkang Xia

(57) ABSTRACT

A foldable baby stroller frame comprises a collapsible wheeled frame, a foldable upper frame, and at least a release mechanism. The collapsible wheeled frame comprises at least a front strut, a pair of rear struts, a pair of lockable articulated arms, and a swivel base. The swivel base is pivotally connected with the front strut and the rear strut, and further has a vertical shaft hole for pivotally connecting and supporting the foldable upper frame. The pair of lockable articulated arms is pivotally connected between the front strut and the rear strut, and has a locked position for keeping the collapsible wheeled frame in an un-foldable state and a foldable position for folding the collapsible wheeled frame. The release mechanism is operatively mounted on the foldable upper frame and associates with the pair of lockable articulated arms via a connecting member for actuating the folding of the collapsible wheeled frame and the foldable upper frame.

18 Claims, 10 Drawing Sheets

FOLDABLE BABY STROLLER FRAME

BACKGROUND OF THE INVENTION

1. Field of the Invention

This invention relates to a foldable stroller frame. More specifically, this invention relates to a stroller that has a collapsible wheeled frame having a swivel base for pivotally supporting a foldable upper frame, and a release mechanism mounted on the foldable upper frame for actuating the folding of the collapsible wheeled frame and the foldable upper frame.

2. Description of the Related Art

Traditional collapsible stroller frame normally has a pair of articulated joints disposed on opposite sides of the frame for pivotally connecting the push arms and the front struts thereof.

As shown in FIG. 12, the articulated joint 9 used to connect the push arm 91 and the front strut 93, typically includes an upper joint member 92 and a lower joint member 94. The push arm 91 is connected with the upper joint member 92 and has a distal portion pivotally connected to the lower joint member 94.

The lower joint member 94 is connected with the front strut 93 and has a slot 941 formed at the upper side thereof. A connecting member 911, a latch member 912 and a spring 910 are movably mounted inside the lower end of the push arm 91. When the push arm 91 is rotated about the lower joint member 94 to aligned to the front strut 93, the spring 910 is functioning to bias the latch member 912 to engage with the slot 941, so as to lock the articulated joint 9 in a non-rotatable state thereby to keep the push arm 91 and the front strut 93 in an erected position.

When folding the collapsible stroller frame, the user may pull the latch member 912 backwardly through the connecting member 91 against the biasing of the spring 910 to unlock the articulated joint 9, this made the push arm 91 is then rotatable, therefore, the traditional collapsible stroller frame is foldable for saving space of storage and transportation.

As the lower joint member 94 of the articulated joint 9 is made of plastic material, in case the slot 941 is broken, the stroll may accidentally become folded in use, this shall endanger the baby passenger sitting inside.

SUMMARY OF THE INVENTION

In order to avoid the possible danger of the traditional collapsible stroller frame, the present invention provides a foldable baby stroller frame with a different folding mechanism.

The foldable baby stroller frame according to the present invention comprises a collapsible wheeled frame, a foldable upper frame, and at least a release mechanism. The collapsible wheeled frame comprises at least a front strut, a pair of rear struts, a pair of lockable articulated arms, and a swivel base.

The swivel base is pivotally connected with the front strut and the rear strut, and further has a vertical shaft hole for pivotally connecting and supporting the foldable upper frame.

The pair of lockable articulated arms is pivotally connected between the front strut and the rear strut, and has a locked position for keeping the collapsible wheeled frame in an un-foldable state and a foldable position for folding the collapsible wheeled frame.

The release mechanism is operatively mounted on the foldable upper frame and associates with the pair of lockable articulated arms via a connecting member for actuating the folding of the collapsible wheeled frame and the foldable upper frame.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENTS

Reference will now be made in detail to presently preferred embodiments of the invention, examples of which are illustrated in the accompanying drawings. An effort has been made to use the same reference numbers throughout the drawings to refer to the same or like parts.

Figure 1:
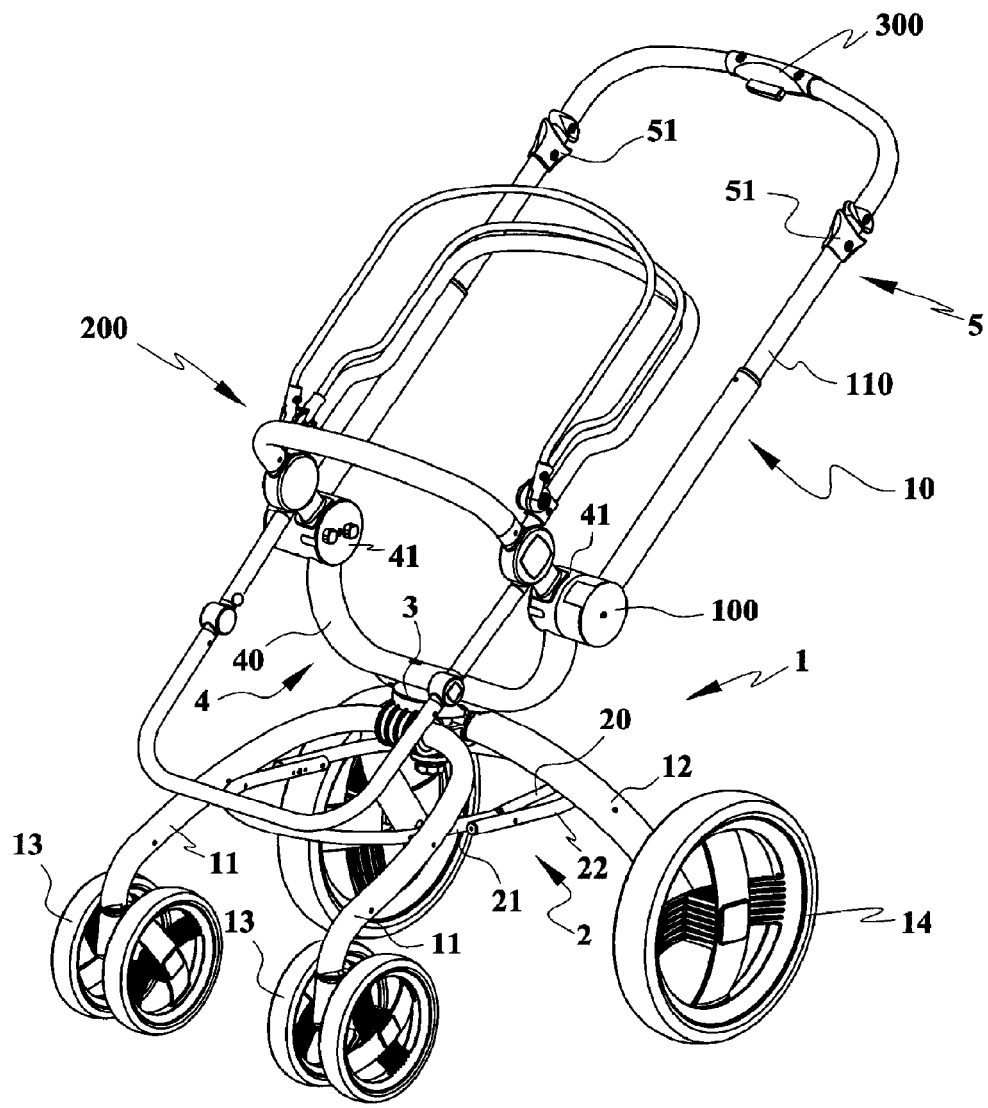
FIG. 1 is a perspective view of a preferred embodiment of the collapsible baby stroller frame of the present invention.
Figure 2:
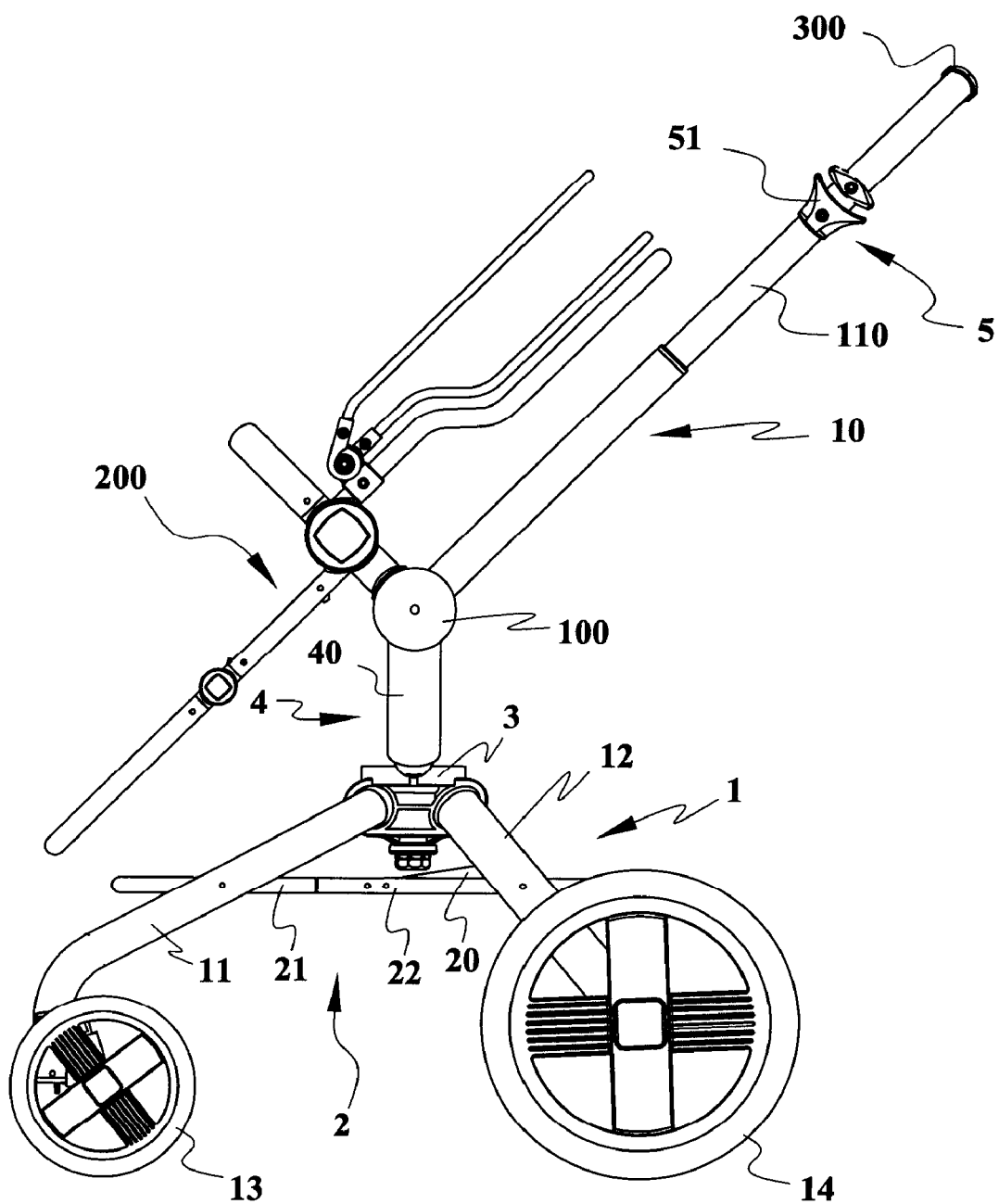
FIG. 2 is a side view of the collapsible baby stroller frame of FIG. 1.
Figure 3:
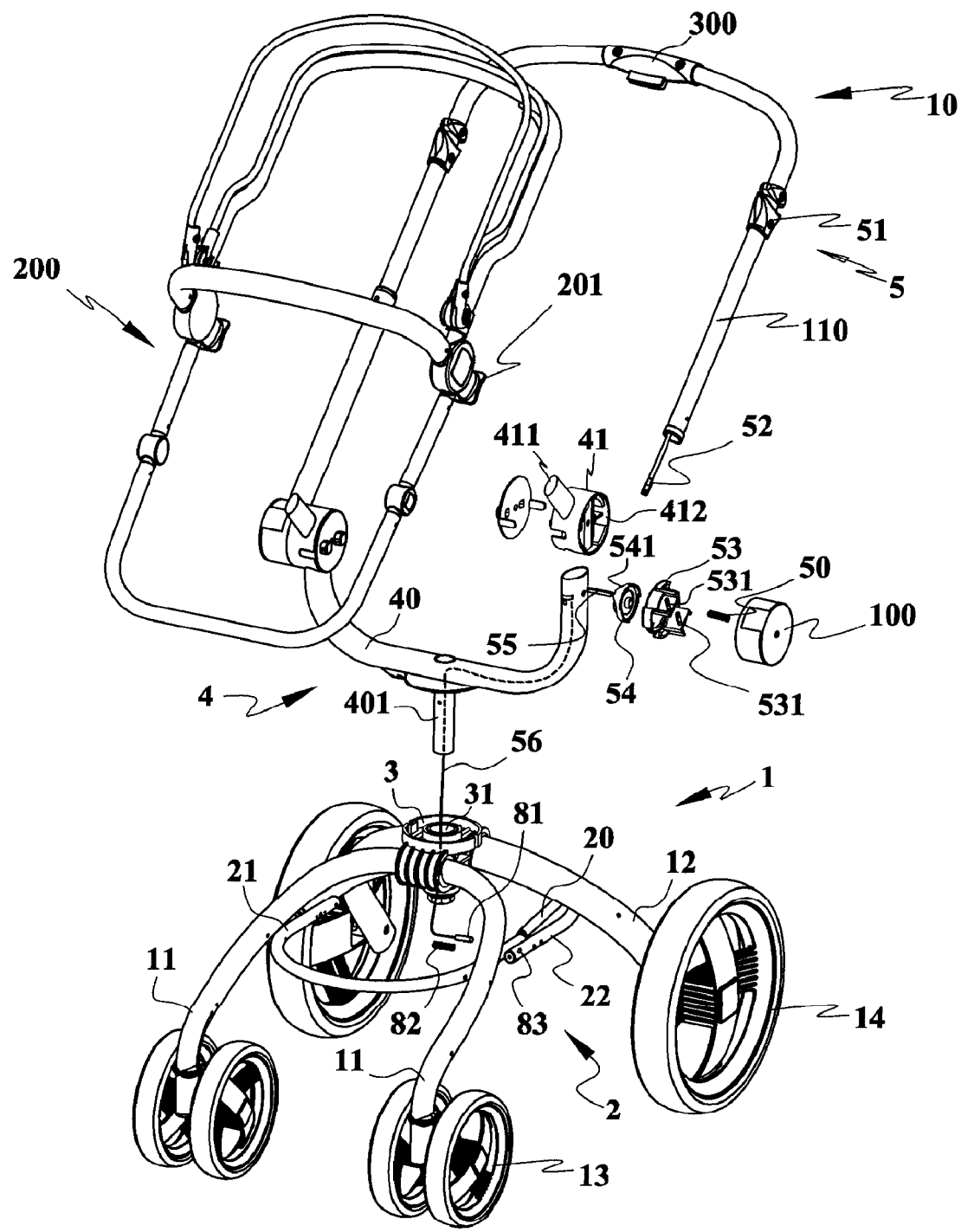
FIG. 3 is a partially exploded perspective view of the collapsible baby stroller frame according to the preferred embodiment.

Referring to FIGS. 1 and 3, a preferred embodiment of the collapsible baby stroller frame according to the present invention comprises a collapsible wheeled frame 1, a foldable upper frame 10, and at least a release mechanism 5.

The collapsible wheeled frame 1 comprises at least a front strut 11 with castor wheels 13, a pair of rear strut 12 with rear wheels 14, a pair of lockable articulated arms 2, and a swivel base 3.

The swivel base 3 is pivotally connected with the front strut 11 and the rear struts 12, and further has a vertical shaft hole 31 for pivotally connecting and supporting the foldable upper frame 10.

The pair of lockable articulated arms 2 is pivotally connected between the front strut 11 and the rear struts 12, and has a locked position for keeping the collapsible wheeled frame 1 in an un-foldable state and a foldable position for folding the collapsible wheeled frame 1.

The release mechanism 5 is operatively mounted on the foldable upper frame 10 and associates with the pair of lockable articulated arms 2 via a connecting member 56 for actuating the folding of the collapsible wheeled frame 1 and the foldable upper frame 10.

The foldable upper frame 10 includes a swivel rack 4, a push arm 110, and a pair of joints 100. The pair of joints 100 are lockable and pivotable connect between the swivel rack 4 and the push arm 110.

Preferably, the collapsible wheeled frame 1 may further comprise a biasing member 20 which can be embodied as a pneumatic rod or resilient member for biasing and helping the folding the pair of lockable articulated arms. The biasing member 20 has one end pivoted to the rear strut 12, and another end pivot to the middle portion of the pair of lockable articulated arms 2.

Figure 5:
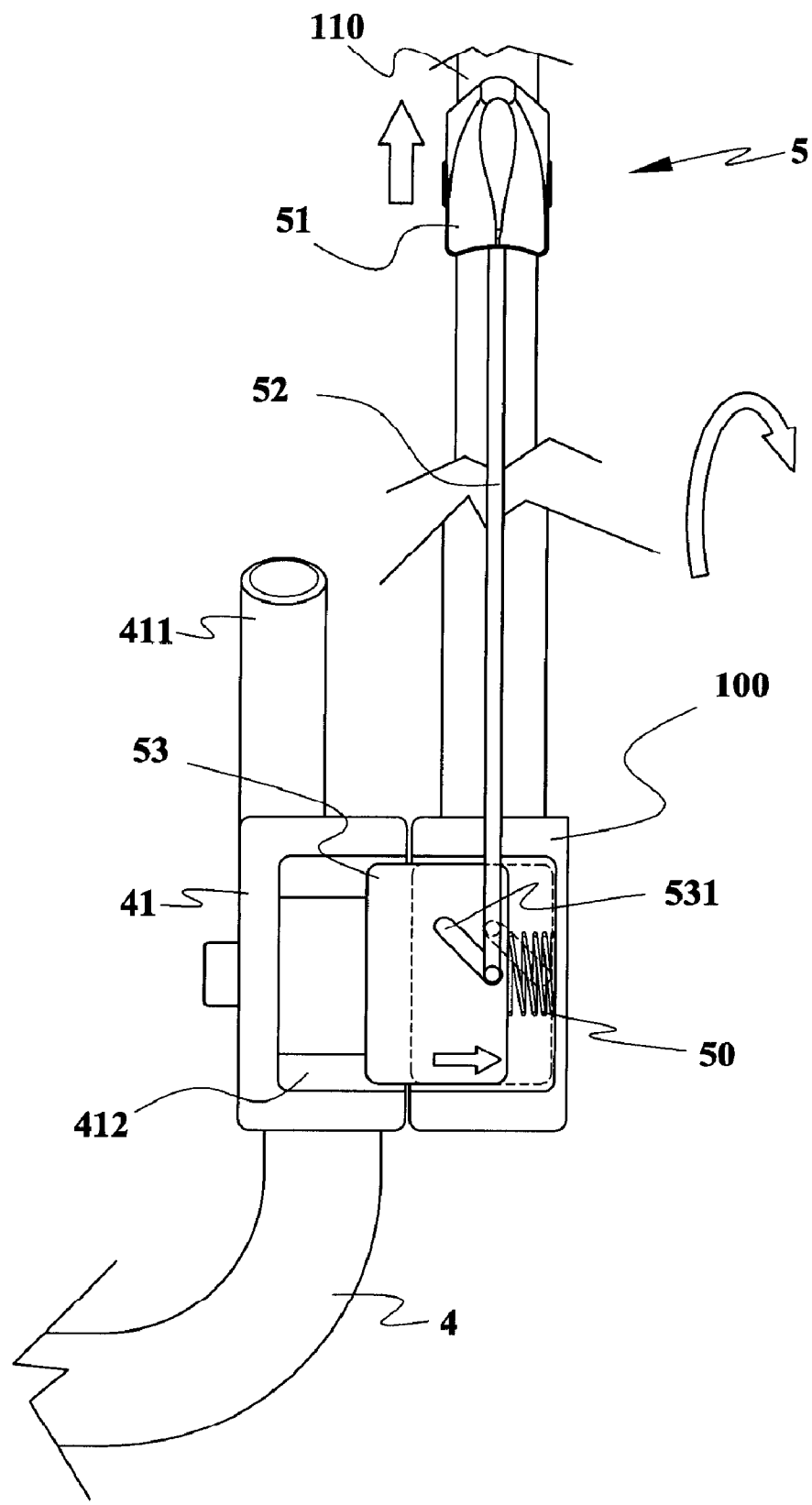
FIG. 5 is a partially cross-sectional view of joint of the foldable upper frame according to the preferred embodiment.

Referring to FIGS. 3 and 5, the swivel rack 4 includes a U-shaped arm 10, a vertical shaft 401, and a pair of mounts 41. The pair of mounts 41 is mounted on the distal ends of the U-shaped arm 10 and has a connecting member 411 for detachably connecting and supporting a seat frame member 200 or a baby carrier (not shown). For instance, the connecting member 411 may be a plug extending upwardly from each of the mounts 41, and the seat frame member 200 or a baby carrier may include a pair of sockets 201 for detachable engaging with the connecting member 411.

The vertical shaft 401 of the swivel rack 4 is connected on the middle portion of the U-shaped arm 10 and extended downwardly for pivotally mounted on the vertical shaft hole 31. This allows caregivers to change the direction of the seat frame member 200 or the baby carrier by turning the swivel rack 4.

The release mechanism 5 is operatively mounted on the foldable upper frame 10 and associates with the pair of lockable articulated arms 2 so as to actuate the folding of the collapsible wheeled frame and the foldable upper frame.

Preferably, the release mechanism 5 may include resilient member 50, a slidable driving member 51, a first connecting member 52, a driving member 53, a driven member 54, a slider 55, and a second connecting member 56.

The slidable driving member 51 is slidably mounted on the push arm 110 and associated with the driving member 53 via the first connecting member 52. The first connecting member 52 is threaded through the push arm 110 and has a lower end which is slidably engaged with a skewed guiding slot 531 formed in the driving member 53.

Each joint 100 may pivotally couple with the mount 41 and forming a space for receiving the resilient member 50, the driving member 53, and the driven member 54. The driving member 53 has a skewed guiding slot, and has an out side for slidably engaging between the mount 41 and the joint 100 in a locked position.

Referring to the FIG. 5, the inner periphery of the mount 41 is formed with a plurality of positioning slots 412 for selectively engaging with the outside of the driving member 53. The driving member 53 is biased by the resilient member 50 and kept in the locked position thereby to lock the joint 100 in an un-rotatable position.

When the first connecting member 52 is pulled upwardly by the slidable driving member 51, the end portion of the first connecting member 52 is sliding along the skewed guiding slot 531, the forces the driving member 53 moving against the biasing of the resilient member 50 thereby to disengage from the positioning slots 412, so as to unlock the joint 100. While the joint 100 is unlocked, the push arm 110 is freely to rotate either upwardly or downwardly.

Figure 4:
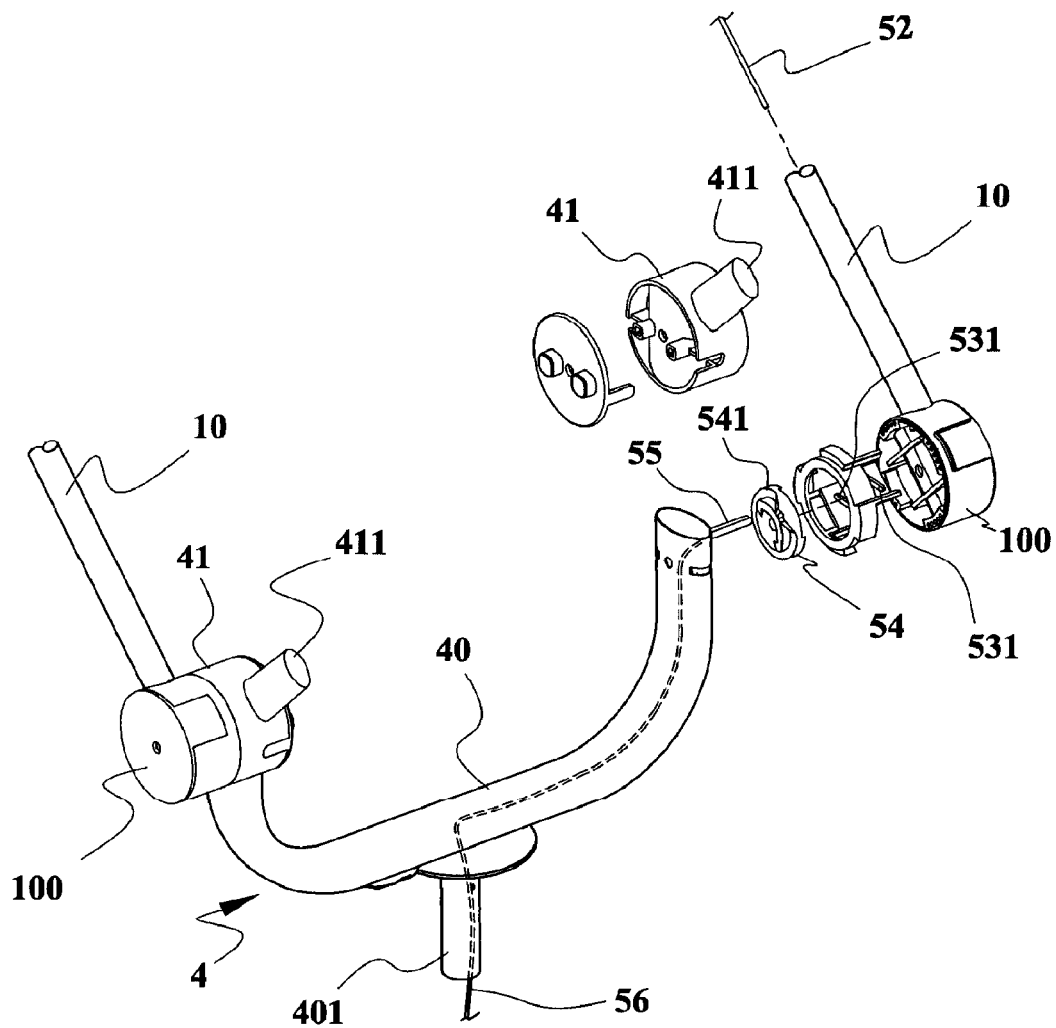
FIG. 4 is a partially exploded perspective view of a foldable upper frame according to the preferred embodiment.
Figure 6:
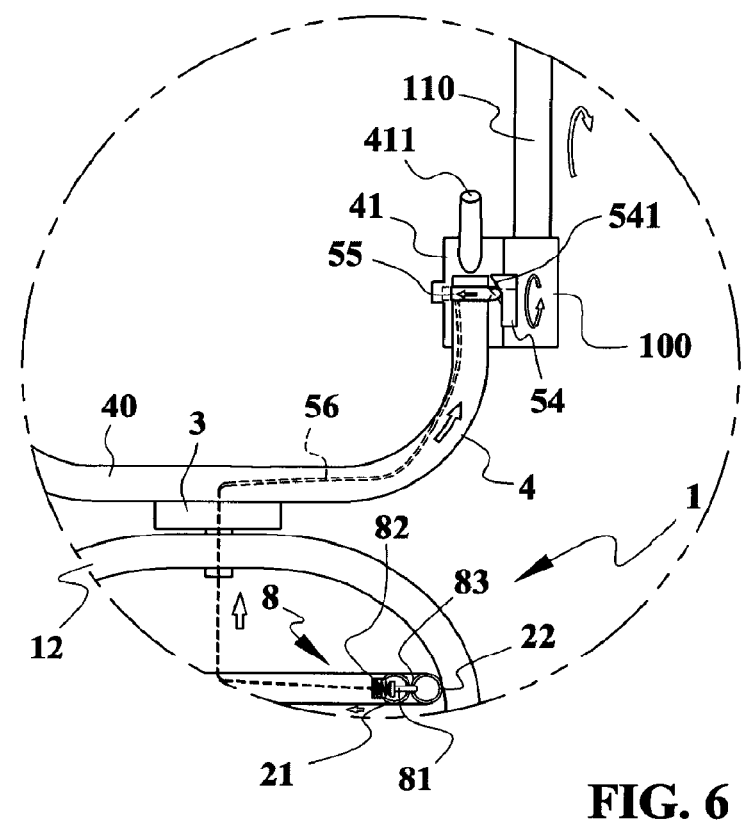
FIG. 6 is a partially schematic cross-sectional view showing the connecting of the collapsible wheeled frame and the foldable upper frame according to the preferred embodiment.

Referring to the FIGS. 3, 4 and 6, the driven member 54 has one side un-rotatably and retractably engaged with the driving member 53 and another side formed with a ramp 541. The slider 55 is movably received in the mount 41 and passes through the upper end of the U-shaped arm 40.

The slider 55 has one end kept slidably abutted on the ramp 541 by a resilient member (not shown), and another end connected with the second connecting member 56. When the joint 100 is unlocked, the driven member 54 is following the rotation of the push arm 110 and the driving member 53, and then the ramp 541 of the driven member 54 drives the slider 55 to move in a direction of pulling the second connecting member 56 upwardly to unlock the pair of lockable articulated arms 2.

Figure 7:
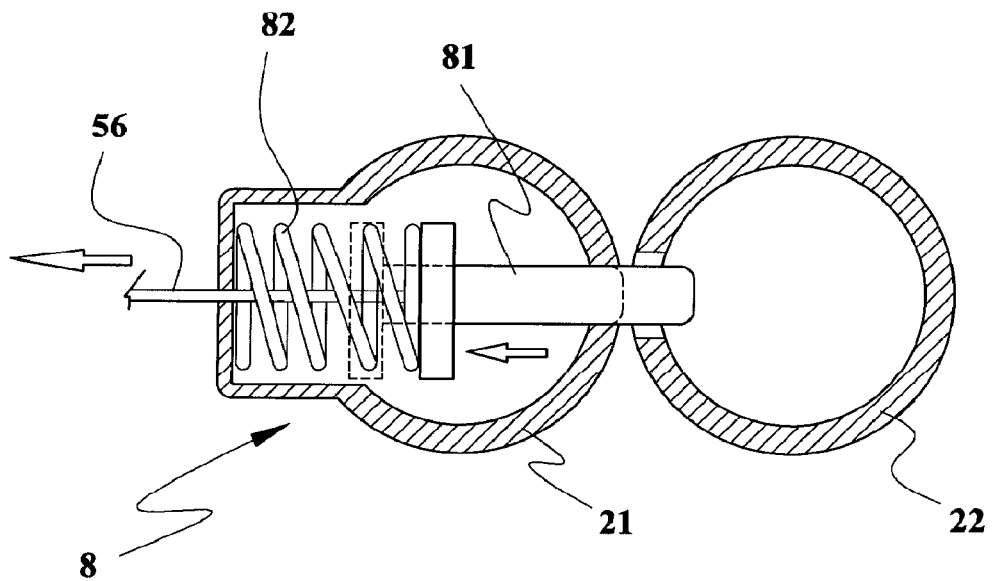
FIG. 7 is a schematic cross-sectional view showing the locking mechanism of the pair of lockable articulated arms according to the preferred embodiment.
Figure 8:
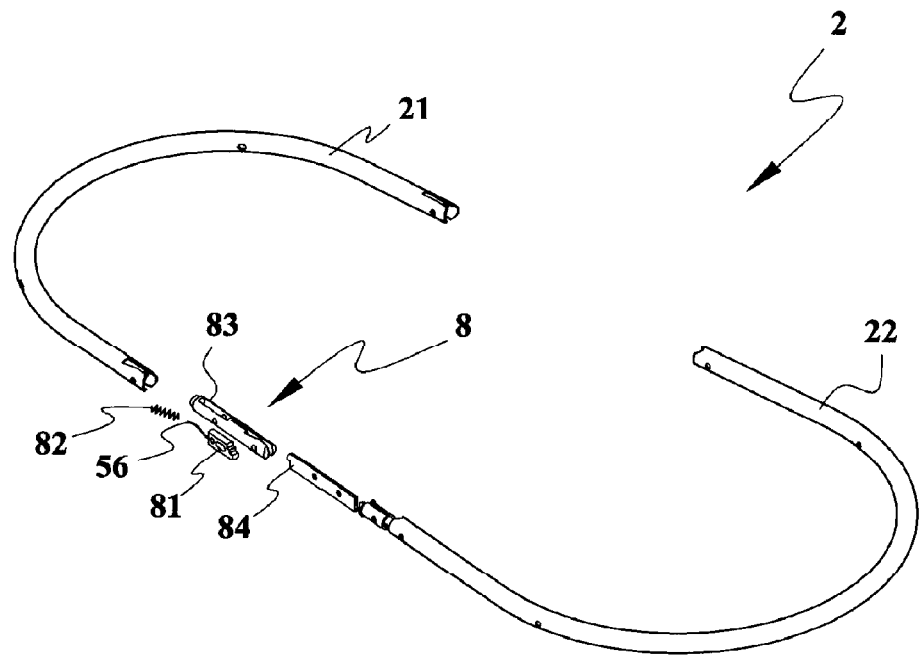
FIG. 8 is an exploded perspective view of the pair of lockable articulated arms of the collapsible baby stroller frame according to the preferred embodiment.

Referring to the FIG. 7, the pair of lockable articulated arms 2 includes a front arm 21, a rear arm 22, and a lockable joint 8. The lockable joint 8 is pivotally connected the front arm 21 and the rear arm 22 and has locked position for preventing the rotation therebetween.

The lockable joint 8 may simply comprises a latch member 81 and a resilient member 82. The latch member 81 is operatively mounted in the front arm 21 and has one end connect with the second connecting member 56 and biased by the resilient member 82 to latch the rear arm 22 with the opposite end thereof. When the second connecting member 56 is pulled upwardly, the latch member 81 is driven to unlatch the rear arm 22, and thereby to unlock the pair of lockable articulated arms 2 into a rotatable position.

Alternatively, the lockable joint 8 may further to embody with a first joint member 83 and a second joint member 84 pivotally connected the first joint member 83, using the first joint member 83 to connect with the front arm 21, and using the second joint member 84 to connect the rear arm 22. The latch member 81 may retractably mounted in the first joint member 83 and configured to be engagable with the second joint member 84. When the second connecting member 56 is pulled upwardly, the latch member 81 is driven to disengage from the second joint member 84, so as unlocks the pair of lockable articulated arms 2.

Figure 9:
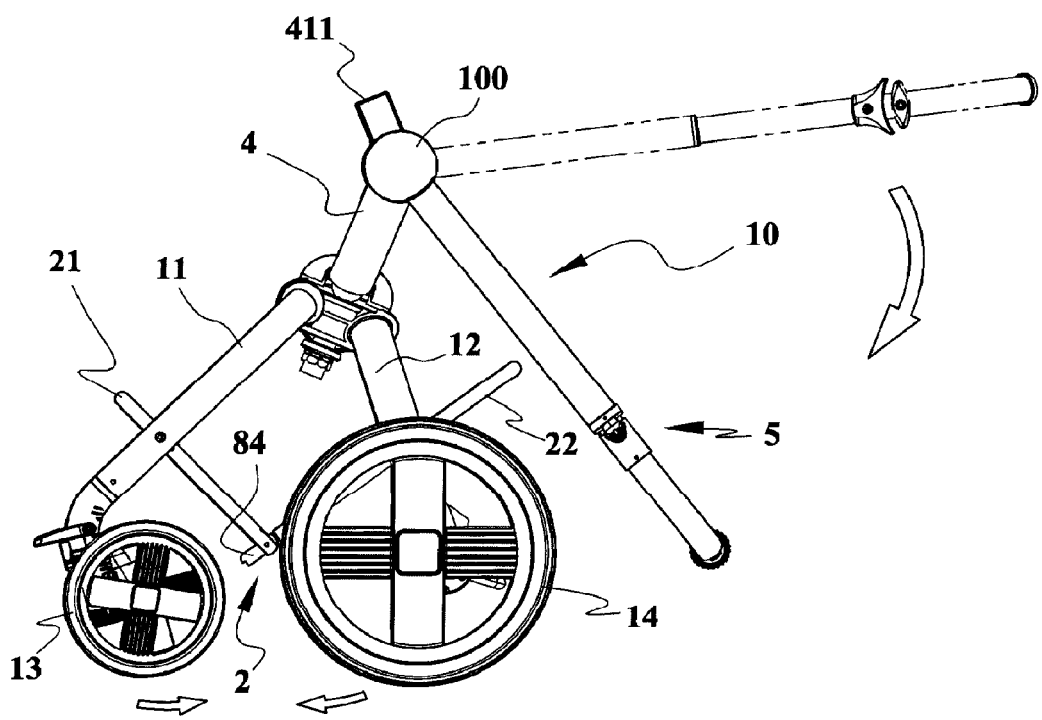
FIG. 9 is a side view illustrating the folding operation of the collapsible baby stroller frame according to the preferred embodiment.
Figure 10:
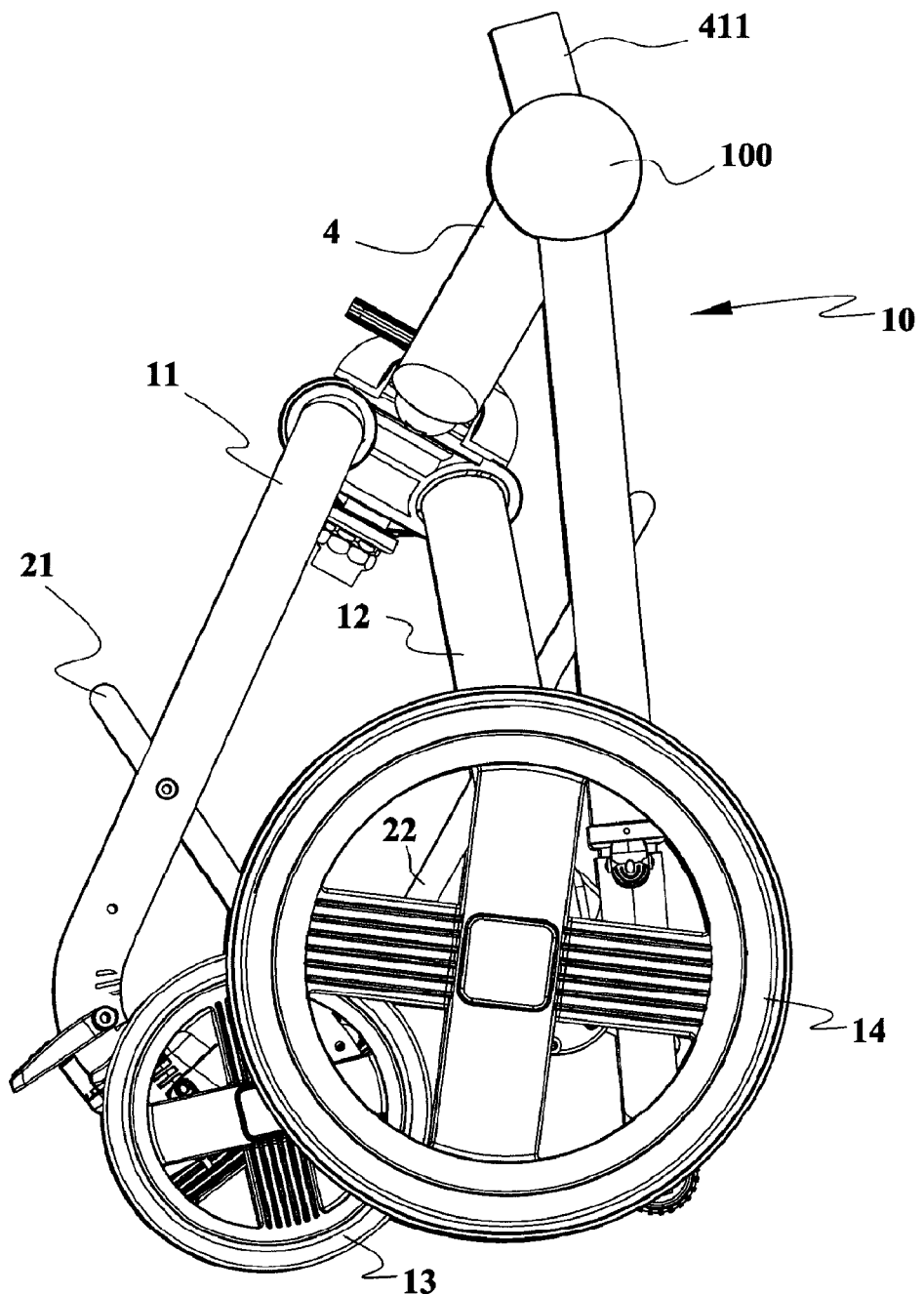
FIG. 10 is a side view illustrating the collapsible baby stroller frame in a folded position after the folding operation.

Referring to the FIG. 9, the front arm 21 is pivoted with the front strut 11, and the rear arm 22 is pivoted with the rear strut 12. When lockable joint 8 is kept in the locked position, the collapsible wheeled frame is kept in an erected position; however, when the joint 100 is unlocked, the push arm 110 can be rotate downwardly, this causes the second connecting member 56 to unlock the pair of lockable articulated arms 2, so as to allow the front strut 11 and the rear strut 12 to rotate to close to each other as shown in the FIG. 10.

Figure 11:
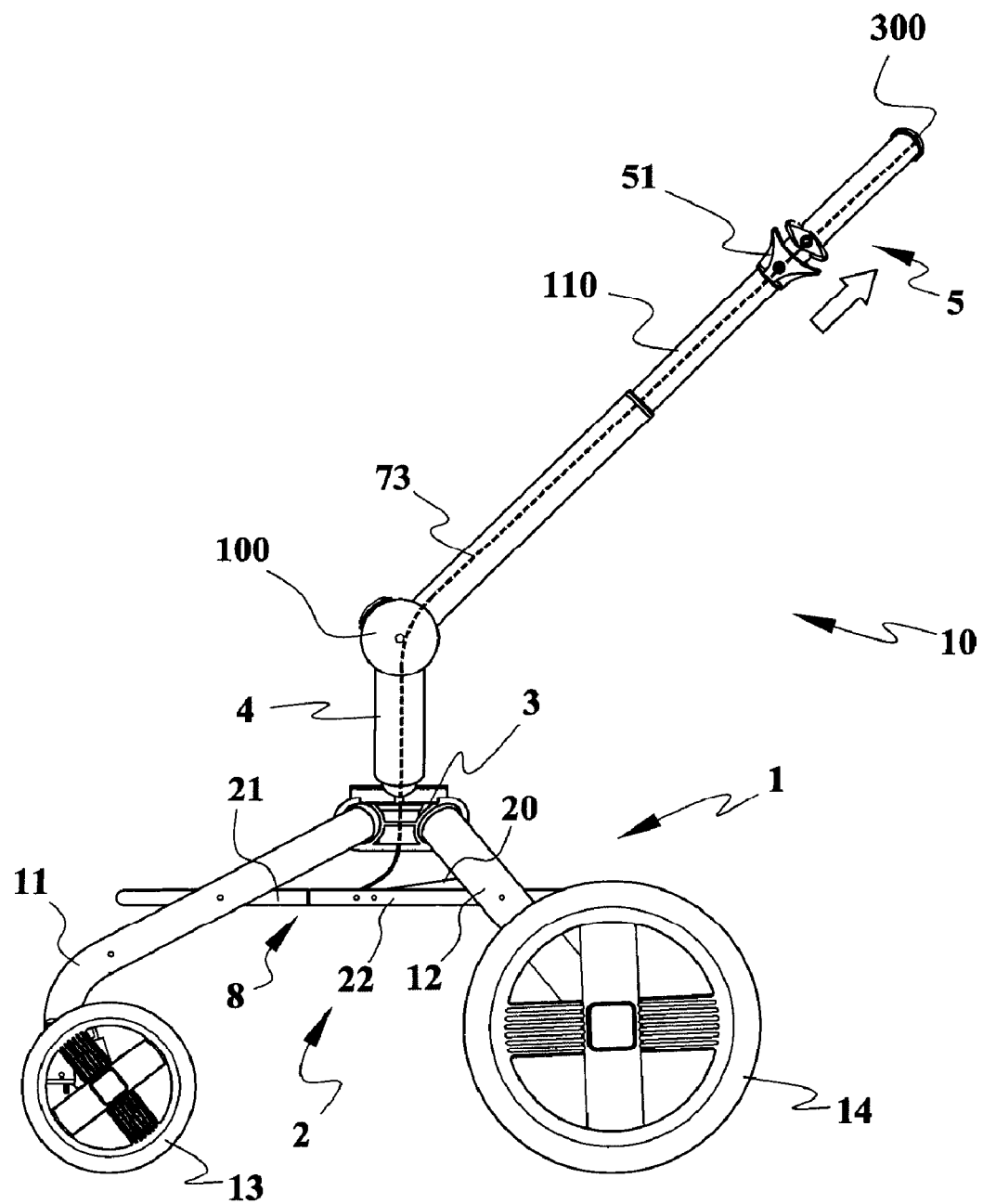
FIG. 11 is a schematic side view showing the operation of the collapsible baby stroller frame according to the preferred embodiment.
Figure 12:
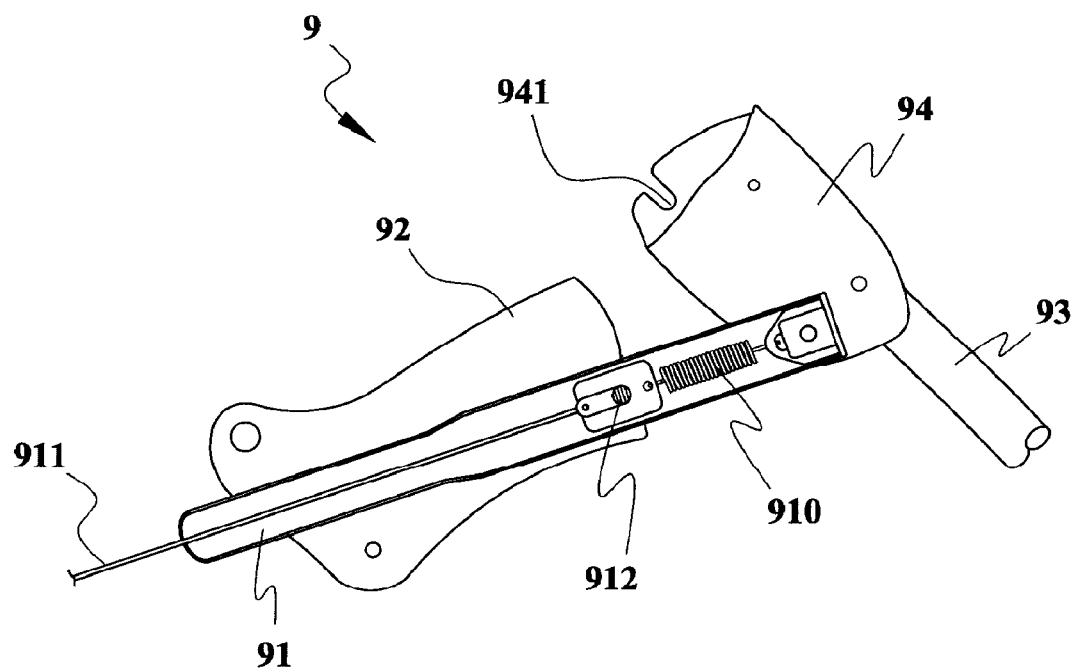
FIG. 12 is a schematic cross-sectional view showing an articulated joint of traditional collapsible stroller frame.

Referring to the FIG. 11, the latch member 81 is alternatively connected with the first connecting member 52 that can be driven by either the slidable driving member 51 or a one-hand controllable folding actuator as disclosed in U.S. Pat. No. 6,443,479.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A foldable baby stroller frame, comprising:
   a collapsible wheeled frame, having a front strut, a pair of rear struts, a pair of lockable articulated arms pivotally and controllably connected between the front strut and the rear struts, and a swivel base pivotally connected with the front strut and the rear struts;
   a foldable upper frame pivotally connected and supported by the swivel base; and
   a release mechanism operatively mounted on the foldable upper frame for unlocking the pair of lockable articulated arms for folding the collapsible wheeled frame,
   wherein the pair of lockable articulated arms includes:
   a front arm pivotally connected with the front strut;
   a rear arm pivotally connected with the rear strut; and
   a lockable joint lockably and pivotally connected between the front arm and the rear arm; and
   wherein the lockable joint includes:
   a latch member retractably mounted on the pair of lockable articulated arms; and
   a resilient member for biasing the latch member to latch the pair of lockable articulated arms in a locked position.

2. The foldable baby stroller frame of claim 1, wherein the latch member is associated with the release mechanism via a connecting member.

3. The foldable baby stroller frame of claim 1, wherein the release mechanism comprises a slidable driving member associated with the latch member via a connecting member.

4. The foldable baby stroller frame of claim 1, wherein the release mechanism comprises a one-hand controllable folding actuator associated with the latch member via a connecting member.

5. A foldable baby stroller frame, comprising:
   a collapsible wheeled frame, having a front strut, a pair of rear struts, a pair of lockable articulated arms pivotally and controllably connected between the front strut and the rear struts, and a swivel base pivotally connected with the front strut and the rear struts;
   a foldable upper frame pivotally connected and supported by the swivel base; and
   a release mechanism operatively mounted on the foldable upper frame for unlocking the pair of lockable articulated arms for folding the collapsible wheeled frame,
   wherein the swivel base has a vertical shaft hole, and the foldable upper frame comprises:
   a swivel rack having an U-shaped arm with two distal ends and a vertical shaft pivotally inserted and connected in the vertical shaft hole;
   a push arm for pushing the baby stroller frame; and
   a joint lockably connected between the swivel rack and the push arm.

6. The foldable baby stroller frame of claim 5, wherein the foldable upper frame further comprises a pair of mounts connected with the distal ends of the U-shaped arm for detachably supporting a seat supporting frame.

7. The foldable baby stroller frame of claim 6, wherein the mounts each have a connecting member, and the seat supporting frame has a pair of sockets for detachable engagement with the connecting member.

8. The foldable baby stroller frame of claim 5, wherein the foldable upper frame further comprises a pair of mounts connected with the distal ends of the U-shaped arm for detachably supporting a baby carrier.

9. The foldable baby stroller frame of claim 8, wherein the mounts each have a connecting member, and the seat supporting frame has a pair of sockets for detachable engagement with the connecting member.

10. A foldable baby stroller frame, comprising:
    a collapsible wheeled frame, having a front strut, a pair of rear struts, a pair of lockable articulated arms pivotally and controllably connected between the front strut and the rear struts, and a swivel base pivotally connected with the front strut and the rear struts;
    a foldable upper frame pivotally connected and supported by the swivel base; and
    a release mechanism operatively mounted on the foldable upper frame for unlocking the pair of lockable articulated arms for folding the collapsible wheeled frame,
    wherein the release mechanism comprises:
    a slidable driving member movably mounted to the foldable upper frame;
    said slidable driving member having a skewed guiding slot;
    a first connecting member having a lower end slidably engaged within the skewed guiding slot and an upper end connected with the slidable driving member;
    a resilient member for biasing and keeping the driving member in a locked position; and
    the foldable upper frame comprises:
    a swivel rack having an U-shaped arm with two distal ends and a vertical shaft pivotally supported and connected with the collapsible wheeled frame;
    a pair of mounts, each having a connecting member and an inner periphery formed with a plurality of positioning slots for slidably engaging with the driving member
    a pair of joints, each pivotally coupled with one of the pair of mounts and formed with a space for receiving the resilient member and the driving member; and
    a push arm having two ends connected with the pair of joints for lockably pivoting about the pair of mounts.

11. The foldable baby stroller frame of claim 10, wherein the driving member is engaged with the plurality of positioning slots in the locked position so as to lock the pair of joints.

12. The foldable baby stroller frame of claim 11, wherein the pair of joints is unlocked by pulling the first connecting member upwardly, thereby to force the driving member moving against the biasing of the resilient member and disengage from the plurality of positioning slots.

13. The foldable baby stroller frame of claim 11, wherein the release mechanism further comprises:
    a driven member having a ramp formed on one side thereof and retractably engaged with the driving member and driven by the driving member to rotate while the pair of joints are unlocked;
    a slider biased by a resilient member and having one end for slidably abutting on the ramp of the driven member; and
    a second connecting member having an upper end connected with the slider, and a lower end for associating with the pair of lockable articulated arms.

14. The foldable baby stroller frame of claim 13, wherein the slider is driven by the ramp while the pair of joints is unlocked and the driven member is rotated by the driving member, thereby to pull up the second connecting member upwardly.

15. The foldable baby stroller frame of claim 13, wherein the pair of lockable articulated arms is unlocked by rotating the push arm while the pair of joints is unlocked by moving the slidable driving member.

16. The foldable baby stroller frame of claim 13, wherein the pair of lockable articulated arms includes:

a front arm pivotally connected with the front strut;

a rear arm pivotally connected with the rear strut; and a lockable joint associated with the slider via the second connecting member, and lockably and pivotally connected between the front arm and the rear arm.

17. The foldable baby stroller frame of claim 16, wherein the collapsible wheeled frame further comprises a pneumatic rod having one end pivoted to the rear strut and another end pivoted to the pair of lockable articulated arms for helping the folding of the pair of lockable articulated arms.

18. The foldable baby stroller frame of claim 16, wherein the collapsible wheeled frame further comprises a biasing member having one end pivoted to the rear strut and another end pivoted to the pair of lockable articulated arms for helping the folding of the pair of lockable articulated arms.

* * * * *